Nov. 7, 1961  R. C. HOFFMAN  3,007,728
JOINT STRUCTURES AND JOINTED SUSPENSION MEANS
Original Filed May 10, 1954  10 Sheets-Sheet 1
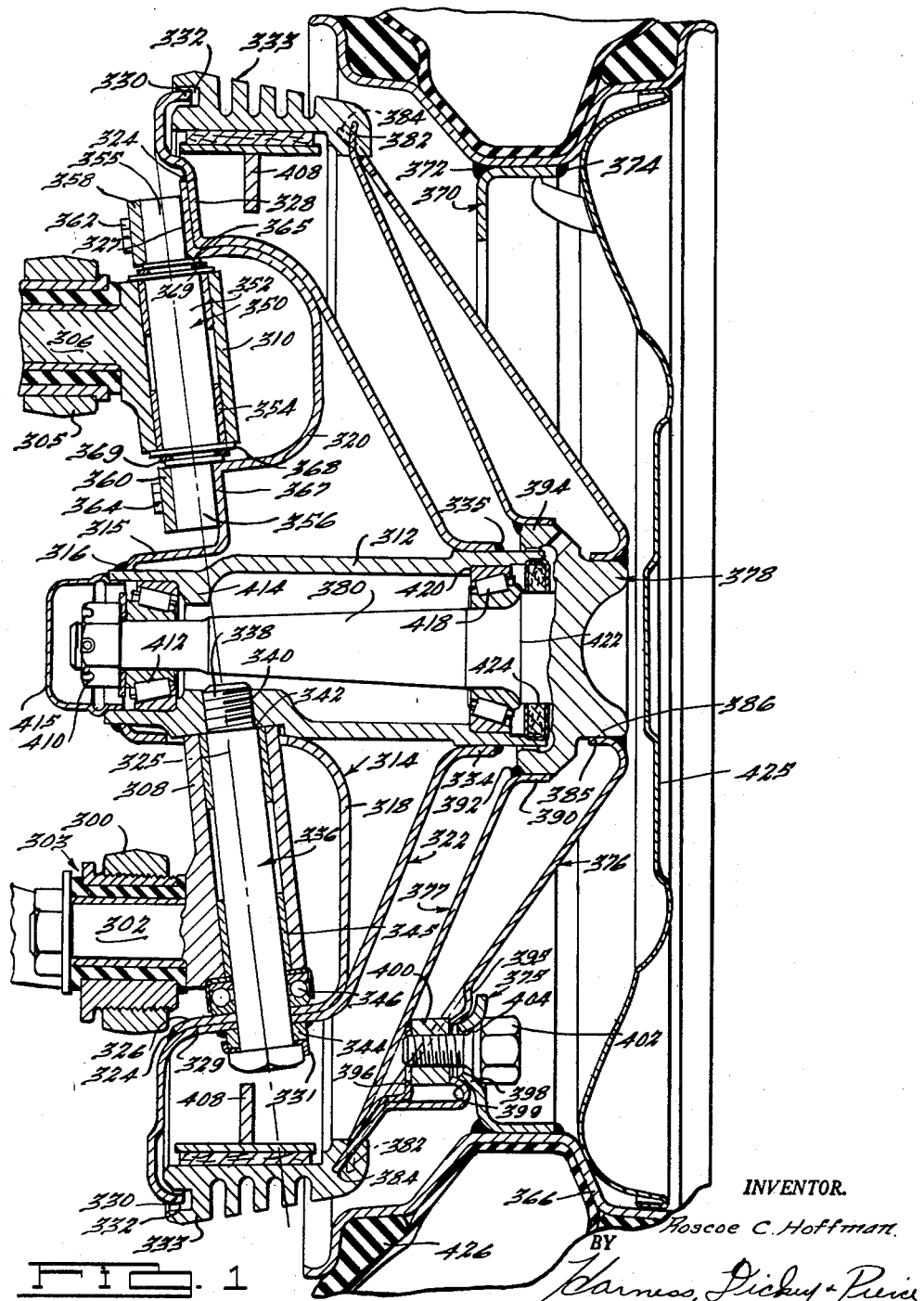
INVENTOR.
Roscoe C. Hoffman.
BY
Harness, Dickey & Pierce
ATTORNEYS.

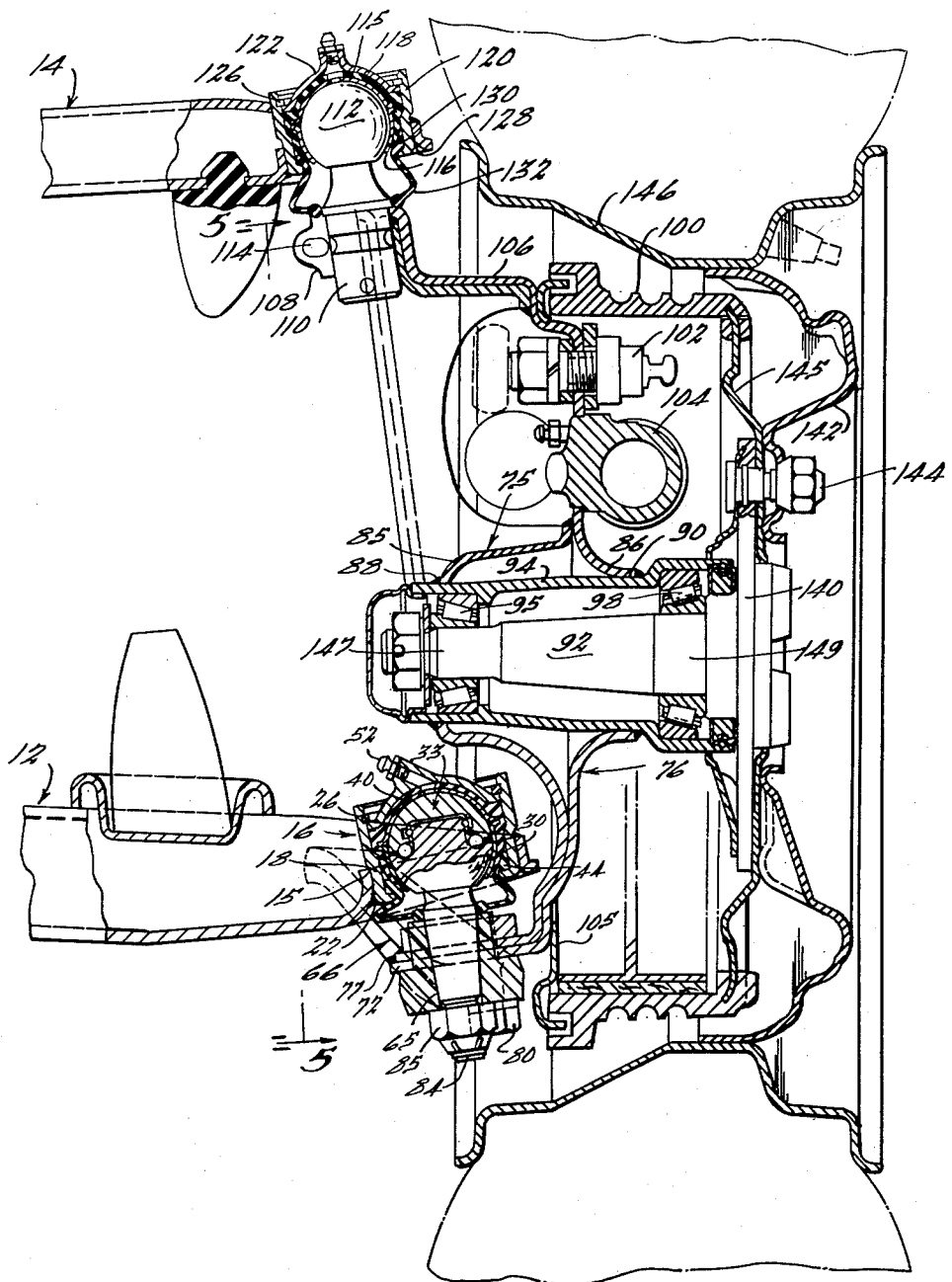

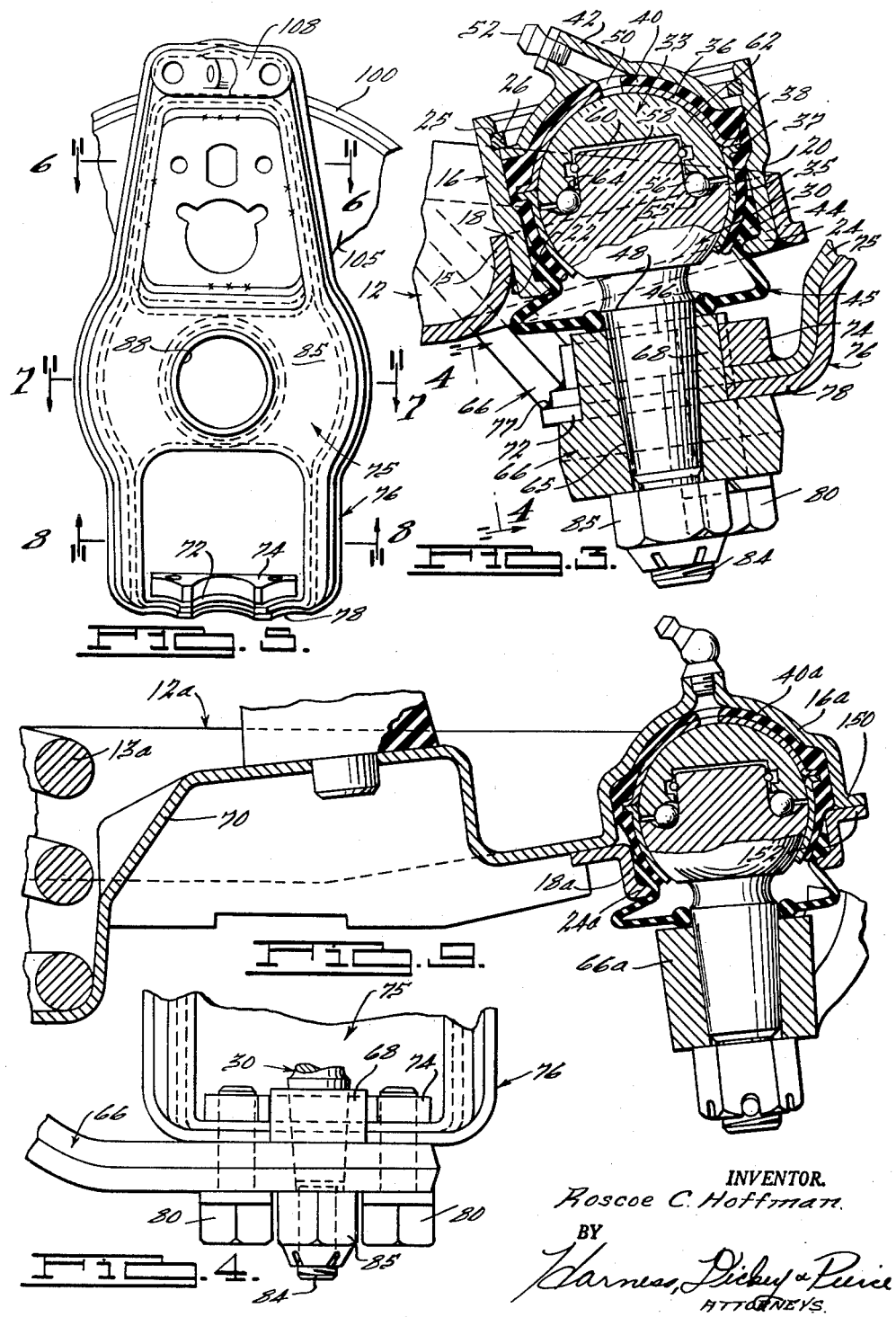

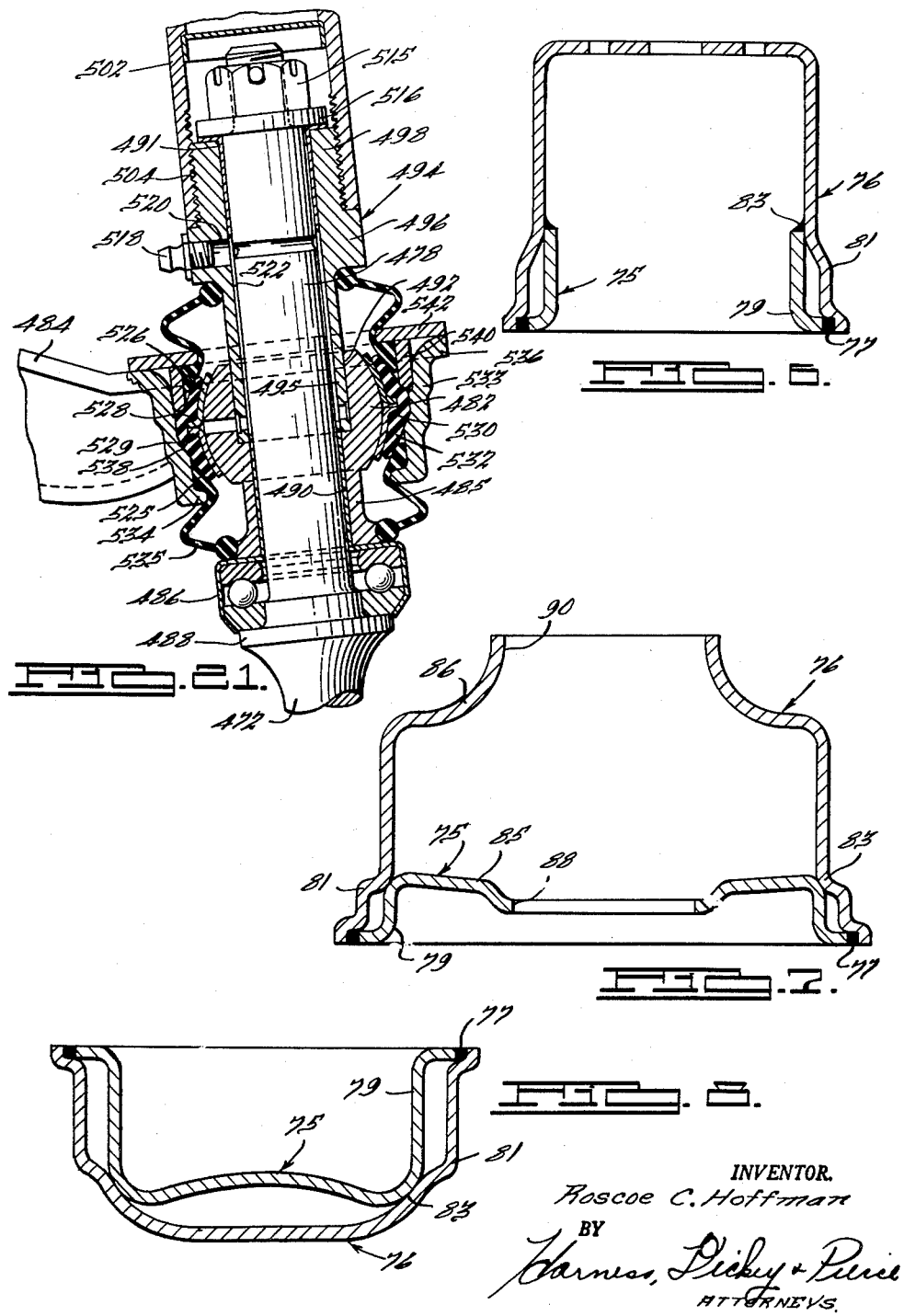

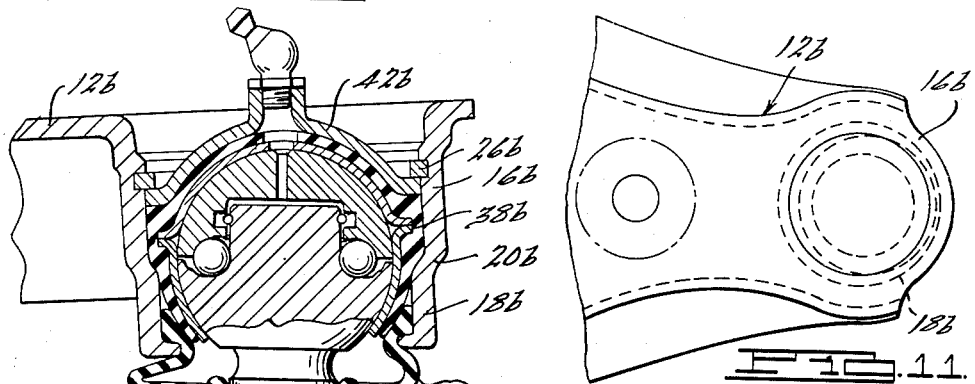
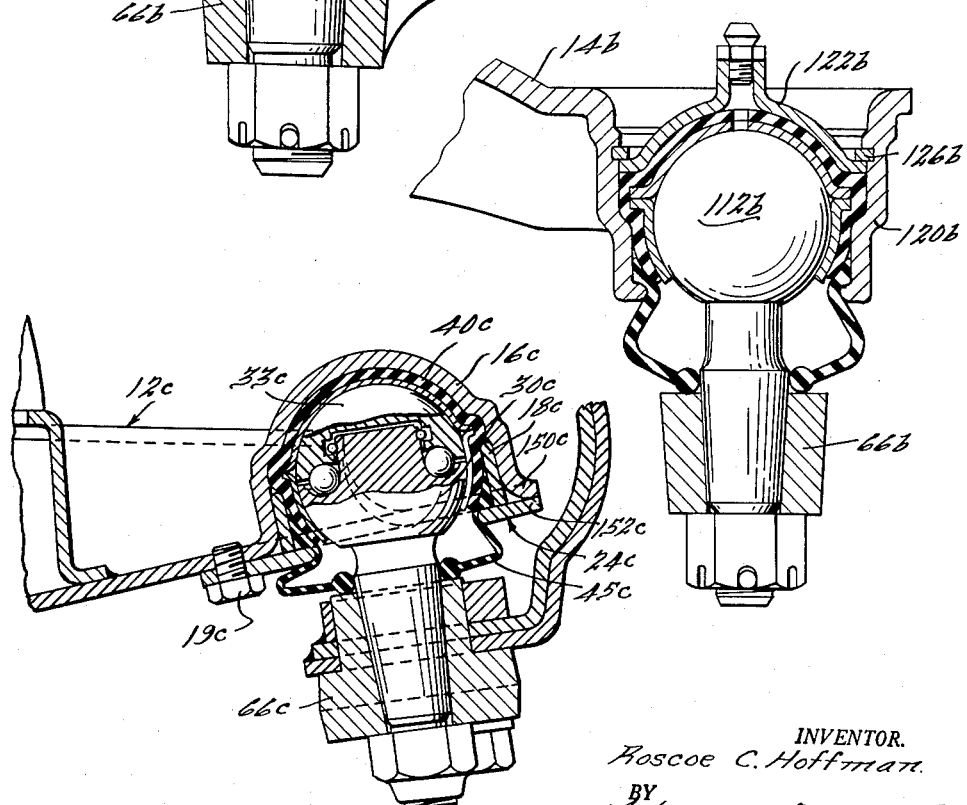

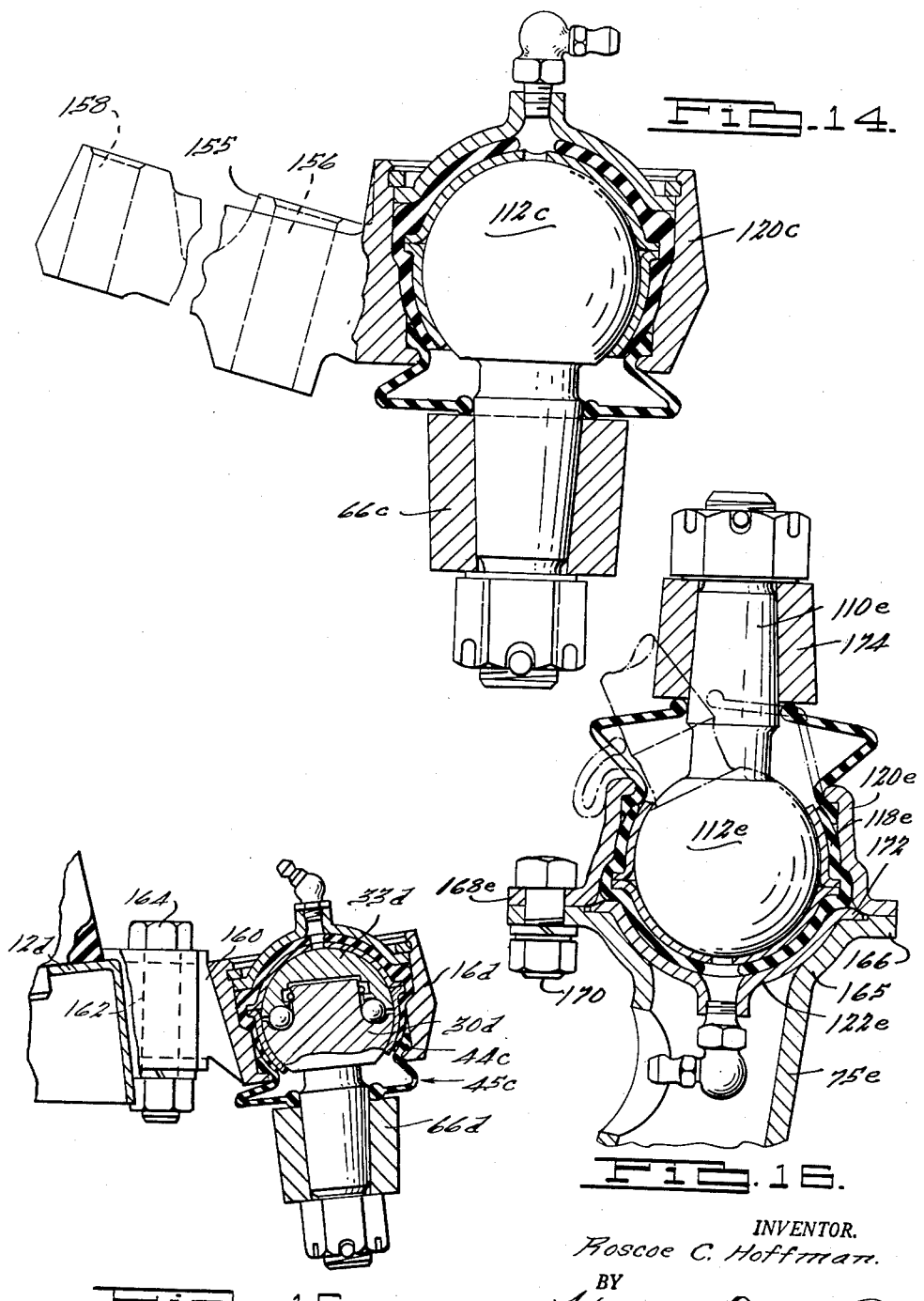

Nov. 7, 1961 R. C. HOFFMAN 3,007,728
JOINT STRUCTURES AND JOINTED SUSPENSION MEANS
Original Filed May 10, 1954 10 Sheets-Sheet 7
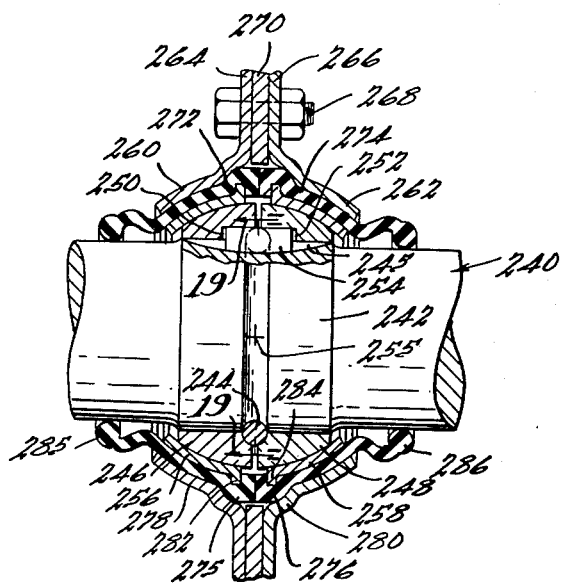
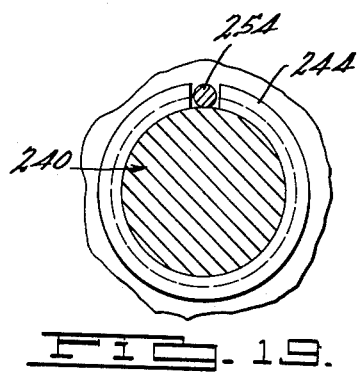
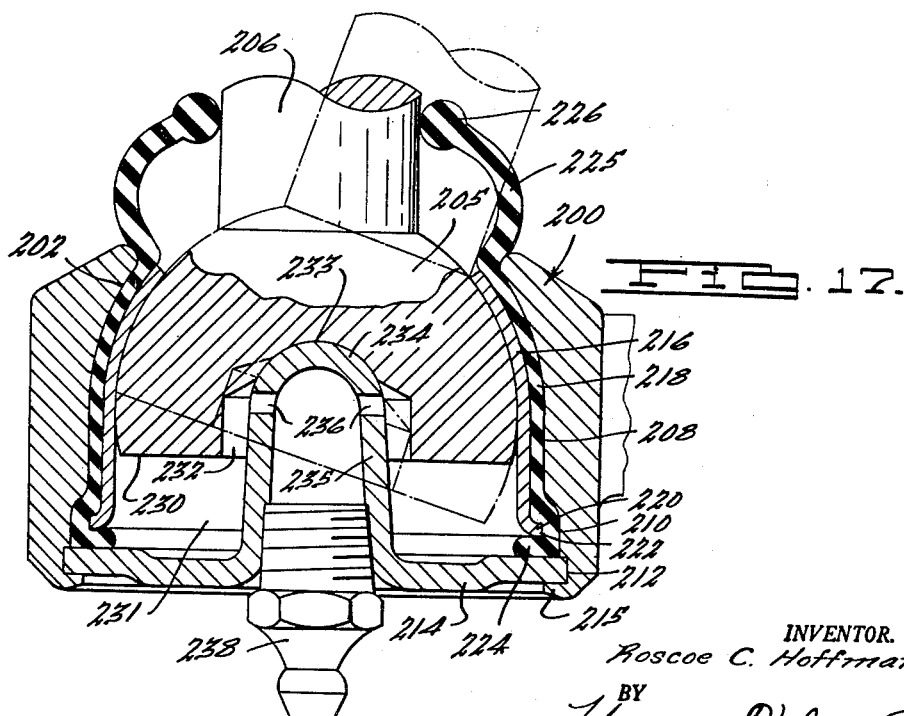
INVENTOR.
Roscoe C. Hoffman
BY
Harness, Dickey & Pierce
ATTORNEYS.

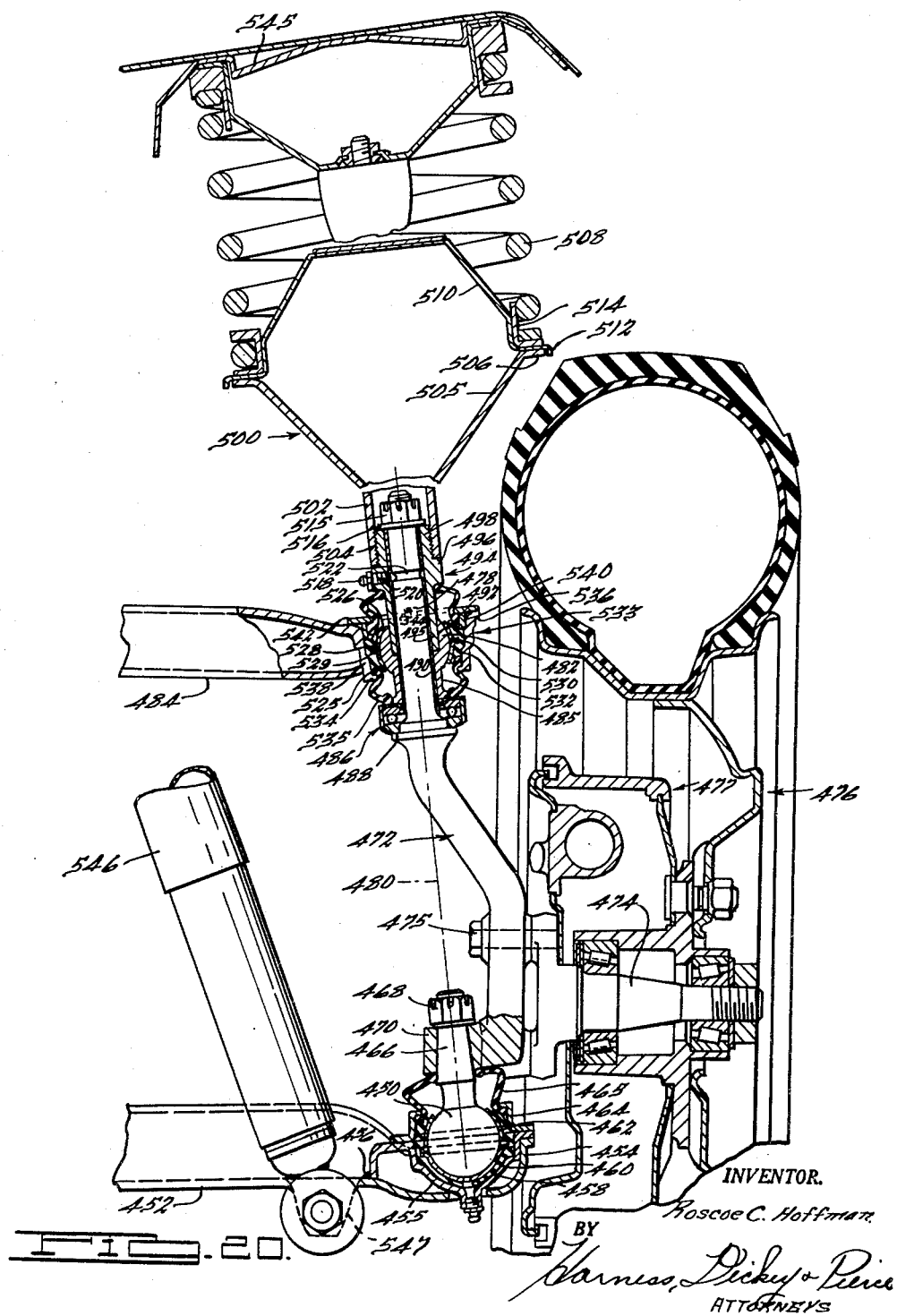

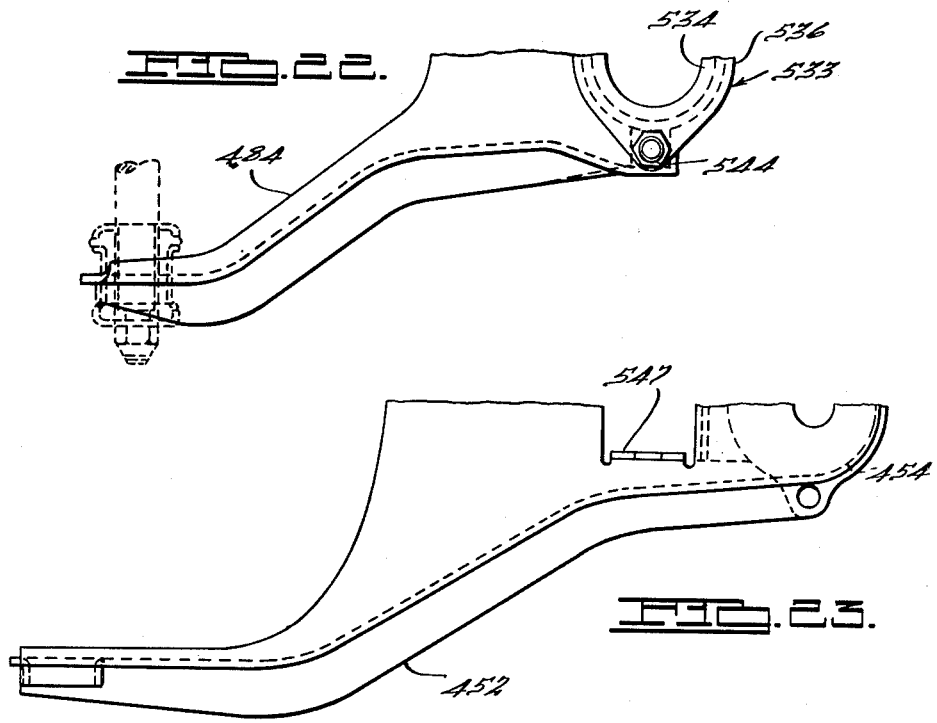

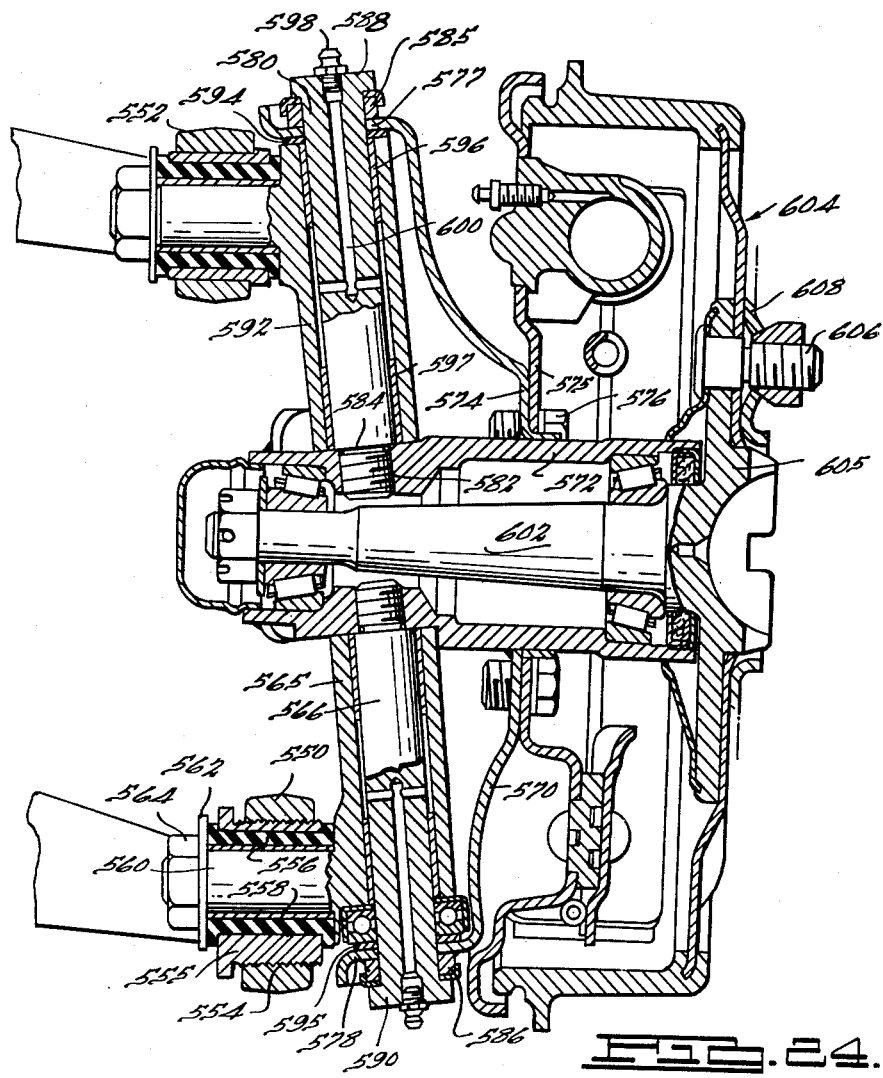

United States Patent Office 3,007,728
Patented Nov. 7, 1961

3,007,728
JOINT STRUCTURES AND JOINTED
SUSPENSION MEANS
Roscoe C. Hoffman, 405 Lodge Drive, Detroit 14, Mich.
Original application May 10, 1954, Ser. No. 428,678.
Divided and this application Mar. 1, 1957, Ser. No. 643,423
5 Claims. (Cl. 287—90)

This invention relates to vehicle wheel suspensions and to oscillatable joints particularly suitable for use in the suspension and steering components of motor vehicles. The present application is a division of my copending application Serial No. 428,678 filed May 10, 1954 and now abandoned.

An important object is to provide devices of the indicated character which are low in cost, well adapted to large scale production, and simple and inexpensive to install and to service.

Still another object is to provide such devices which are adaptable for use with different types of suspensions, including suspension systems of the wishbone type and suspension systems of the trailing link type.

Another important object of the invention is to provide improved ball-type joints which are inexpensive to construct and easily assemblable in large scale production, and the parts of which are conveniently accessible for servicing operations.

Another object is to provide ball-type joints of the indicated character incorporating rubberlike cushioning means, and the parts of which are so interrelated that they are effectively held against the development of looseness due to wear, and against the danger of rattling, over a long useful service life.

Still another object is to provide spherical-type joints of the indicated character having a large proportion of the parts thereof so designed that they may be economically formed of sheet metal, and in which all of the components are of relatively large size and rugged in their construction, so that the danger of failure in service is reduced.

Other objects and advantages of the invention will become apparent upon consideration of the present disclosure in its entirety.

In the drawings:

FIGURE 1 is a vertical sectional view of a front steerable wheel of a motor vehicle, and suspension means therefor, incorporating the principles of the present invention;

FIG. 2 is a view similar to FIG. 1 showing a modified construction;

FIG. 3 is a sectional elevational view of the lower ball joint and adjacent components of the modification of FIG. 2, shown on a larger scale;

FIG. 4 is a fragmentary elevational view taken substantially on the line 4—4 of FIG. 3, and looking in the direction of the arrows;

FIG. 5 is an elevational view of the steering knuckle support, shown apart from the other elements and on a reduced scale, looking in the direction indicated by the line and arrows 5—5 of FIG. 2;

FIG. 6 is a sectional view of the support illustrated in FIG. 5, taken on the line 6—6 thereof and looking in the direction of the arrows;

FIG. 7 is a sectional view of the support illustrated in FIG. 5, taken on the line 7—7 thereof and looking in the direction of the arrows;

FIG. 8 is a sectional view of the support illustrated in FIG. 5, taken on the line 8—8 thereof and looking in the direction of the arrows;

FIGS. 9 and 10 are fragmentary sectional elevational views, on a larger scale than FIG. 2, showing modified ball joint mounting structures for connecting a lower wishbone arm to a vehicle wheel;

FIG. 11 is a fragmentary top plan view of the lower wishbone arm illustrated in FIG. 10, and showing the arm apart from the other elements and on a reduced scale;

FIGS. 12, 13, 14 and 15 are fragmentary sectional elevational views, on a larger scale than FIG. 2, showing modified ball joint structures adapted for connecting a lower wishbone arm to a vehicle wheel;

FIG. 16 is a similar sectional elevational view showing a modified ball joint construction suitable for connecting an upper wishbone-type suspension arm to a motor vehicle wheel support;

FIGS. 17 and 18 are cross-sectional views of further modified ball-type oscillatable joints;

FIG. 19 is a sectional detail taken substantially on the line 19—19 of FIG. 18;

FIG. 20 is a view similar to FIGS. 1 and 2, showing a further modification;

FIG. 21 is a sectional elevational view of the upper joint and adjacent components of the modification of FIG. 20, shown on a larger scale;

FIG. 22 is a fragmentary top plan view of the upper suspension arm illustrated in FIG. 20, showing the same apart from the other elements illustrated in FIG. 20 and on an enlarged scale;

FIG. 23 is a bottom plan view of the lower suspension arm illustrated in FIG. 20, showing the same apart from the other elements and on an enlarged scale; and FIG. 24 is a view similar to FIGS. 1 and 2 showing a further modification.

Referring now to the drawings, the preferred construction shown in FIG. 1 is adapted for incorporation in a suspension of the trailing arm type. The lower trailing arm is fragmentarily shown at 300 and is pivotally connected at its rear, wheel-connected end to a transverse stud 302, as by means of a prestressed, rubber-bushed joint assembly generally designated 303 and which may be of the "Silentbloc" or any other suitable type. The upper trailing suspension arm is designated 305 and is similarly pivotally connected at its rear end to a stud 306, the two arms being pivoted at their front ends to the chassis or vehicle frame structure (not shown) by suitable pivot means and defining essentially a linkage of the parallelogram type which maintains desired angularity of the steering axis during springing movements of the wheels.

Stud 302 is integral with a lower kingpin supporting portion 308, concentric with the steering axis, while stud 306 is integral with an upper kingpin supporting portion 310 located above the wheel spindle and also concentric with the steering axis. The kingpin means consists of two sections, viz; a lower kingpin bolt 336 rockable in supporting portion 308 and an upper kingpin member 350 rockable in supporting portion 310. The kingpin means, which will presently be considered in greater detail, is rigidly connected to the spindle supporting tube 312 by a sheet metal support consisting of two nested sections, comprising an inner section generally designated 314 connected to the inner end of the supporting tube 312 and an outer section 322 connected to the outer end of the supporting tube. Inner section 314 is provided with a generally cylindrical inwardly projecting boss-like portion 315 concentric with and welded to tube 312 as indicated at 316. The member 314 is pressed outwardly in a lower area, designated 318, to provide clearance with respect to the lower kingpin supporting portion, and pressed outwardly in an upper area designated 320 to clear the upper kingpin supporting portion. The periphery of the inner support section 314 is flanged to conform to and is fitted against a peripheral portion of outer section 322 and is welded thereto, as indicated at 324. Outer section 322 also acts as the brake backing plate. Due to the fact that the steering axis 325 slopes inwardly toward the top, to provide a camber angle, the lower kingpin clearance embossment 318 of member 314 is relatively deep, and the flange portion 326 of member 314 which is secured to the member 322 extends generally in a horizontal direction. At the upper end of member 314 the securing flange portion, designated 327, which forms a continuation of the flange portion 326, extends generally vertically and lies substantially flat against a mating flat area 328 of the plate 322. The plate member 322 extends radially outwardly beyond the member 314 and is provided with a circular outwardly return bent flange 330 which extends into a groove 332 in the brake drum 333 in the conventional manner. The intermediate portion of the plate 322 is of truncated conic form and slopes outwardly of the vehicle, being provided at its inner periphery with a cylindrical outwardly projecting collar portion 334 which is concentric with the spindle supporting tube 312 and annularly welded thereto as indicated at 335.

The lower kingpin supporting portion 308 is journaled upon the kingpin bolt 336, the bolt 336 having at its upper end a threaded portion 338 which is engaged with a conformably tapped hole 340 in the spindle supporting tube 312. The bolt 336 is shouldered at 342 to seat tightly against tube 312. The head of the bolt lies below the overlapping flange portions 326, 329 of the supports 314, 322 respectively. The flange portions 326, 329 are reinforced by a stiffening plate 344 welded beneath the flange portion 329 and the bolt is locked against unscrewing by a key 331.

Smooth bearing bushings, as 345, may be interposed between the cylindrical stem portion of the kingpin bolt 336 and the kingpin supporting portion 308, and a thrust bearing of the antifriction type, as 346, may be arranged upon the stem of the bolt between the lower end of kingpin supporting portion 308 and the surface of flange 326. The bearing 346 is, of course, desirable at this point if the spring reaction is taken by the lower arm 300, although its desirability depends upon the weight and steering characteristics of the vehicle and the location of the spring, and such thrust bearing could be omitted or employed upon the top kingpin member 350 if desired.

The upper kingpin member 350, which, as previously indicated, is coaxial with the lower kingpin bolt 336, is provided with a central cylindrical portion 352 on which the wheel structure is oscillatably mounted for steering movements, as upon the smooth bearing means 354, and with reduced and flattened upper and lower terminal portion 355, 356. Portions 355, 356 serve as supporting and clamping portions, being held by means of retaining clamps as 358, 360 secured by suitable bolt means as 362, 364, the bolt 362 threadably engaging the backing plate-flange portion 328 of member 314, while the bolt 364 threadably engages a land portion 367 formed on member 314 nearer the center and coplanar with portion 328.

Upward and downward movement of kingpin supporting portion 310 is prevented by spaced stop members 365 and 368 retained by snap rings 369, the stop members 365 engaging the embossment 320 and the stop members 368 engaging the supporting portion 310.

My preferred wheel construction includes a rim 366, which may be of conventional cross section, as shown, to the inner periphery of which a lug ring 370 is secured, as by welding, as shown at 372, 374. A plurality of radially inwardly extending lug portions 375 are formed on the ring 370 and means are provided for securing such lug portions to substantially conic sheet metal webs 376, 377. Webs 376, 377 are in turn secured at their inner peripheries to axially spaced portions of a hub 378 formed integrally with the spindle 380. At their outer peripheries the webs 376, 377 are cast into the brake drum 333. The interlocked engagement between such webs and the brake drum may be enhanced by the provision of hooked tongues, as 382, 384, bent laterally from peripheral portions of the webs which are enclosed within the metal of the braked rum. The outer web 376 is formed as a steeper cone than the inner web 377, and is provided at its inner periphery with a substantially cylindrical inturned flange 385 seated upon a cylindrical surface 386 of the hub 378 and welded thereto as indicated at 388. The inner periphery of web 377 is provided with an outturned cylindrical flange 390 welded as at 392 to the hub 378. In the preferred construction, the hub is provided with an axially inwardly extending flange 394 which supports web flange 390. In a position in alignment with each of the lug portions 375, the webs 376, 377 are provided with substantially flat lands embossed therein. One of such lands of the web 376 is shown in FIG. 1, and designated 395, while the correspondingly radially positioned stepped land of web 377 is designated 396. Coaxial holes are formed in each of the lug portions 375 and in the corresponding stepped lands 395, 396. In the area around such hole in the lug portion 375, the metal of the lug may be pressed to truncated conic form, as shown at 398, and the metal of the land 395 is shaped to similar conic form as indicated at 399. A nut 400 is trapped between the stepped lands 395, 396 and is welded to both lands in a position concentric with the holes therein, and is adapted to receive the conformably threaded stem of a bolt 402 threaded therein from the outer surface of the lug portion 375. The under surface of the head of the bolt is also of conic form, as indicated at 404, and conforms to the cone portions 398, 399. By reason of the conic shape of the interfitted parts 398, 399 and the corresponding conic shape of the securing portion of the bolt, the separable parts of the wheel structure and lug are loaded in compression, and the compressive force is exerted against relatively large surface areas.

The angular relationship of the sheet metal members 314, 322, 376, 377 is such that they afford great stiffness, so that they may be formed of relatively light gauge steel or other metal and provide maximum strength in proportion to their weight. The location of the kingpin bearings close to the suspension bearings, and the mounting of the brake drum in a position substantially surrounding both such sets of bearings permits the use of a drum of large diameter, and positions the drum closer to the center line of the car and in an area which is not surrounded by the tire, thereby permitting effective air stream cooling.

The brake shoe assemblies are generally designated 408, and are accommodated in the space surrounding the inwardly embossed intermediate portions 318, 320 of the inner supporting plate 322 and the conforming surrounding flange portions 329 of outer supporting plate 322.

The spindle 380 is retained by a wheel nut 410 threaded upon its inner end. The nut retains an inner wheel bearing assembly 412 seated against an internal shoulder 414 in the tube 312. The tube 312 is open at its inner end and the nut and bearing are protected by a knockoff cover 415. The outer wheel bearing 418 is seated against an internal shoulder 420 near the outer end of tube 312 and is retained by a shoulder 422 located substantially at the juncture between spindle portion 380 and its integral hub portion 378. This arrangement will be seen to permit the use of a relatively large outer wheel bearing. A conventional friction seal may be provided at the outer end, as indicated at 424. In the preferred method of construction, the tube 312 is induction heated at both ends and forged to shape.

It will be seen that this construction adapts itself readily to ornamental disk-type wheel covers which may be provided with a plated surface, or formed of stainless steel. Such an enclosure is indicated at 425. For tire servicing, the relatively light assembly consisting of the tire 426 with the rim 366 and lug ring 370 may easily be removed by unscrewing the bolts 402. For brake servicing, removal of the wheel nut 410 permits complete removal of the wheel, spindle and brake drum, fully exposing the brake shoes 408 and their actuating mechanism (not shown).

In the embodiment of FIG. 2, reference character 12 designates generally a control arm, indicated as of the wishbone type and which will be considered as forming the lower suspension arm of an independent suspension system for a front motor vehicle wheel. Reference character 14 designates the upper control arm. While the details of the control arm are subject to variation, they are preferably formed of sheet metal. At its outer end, the lower arm is pierced and upset to provide a generally vertical and substantially cylindrical collarlike flange 15 in which is fitted a cylindrical sleeve 16, which may be formed of a sheet metal tube. A lower portion constituting somewhat less than half the length of the sleeve 16 is slightly reduced, such reduced portion being designated 18 and the reduction thereof defining a shoulder 20 which limits the extent of insertion of the tube 16 in the collar 15. The tube and collar may be welded togeher peripherally near the lower end as indicated at 22.

The lower end of tube 16 is flanged inwardly as indicated at 24, while near the upper end a groove 25 is formed in its inner wall to receive a snap ring 26. Fitted in the sleeve 16 are socket-defining parts which coact with and retain a two-part ball assembly consisting of a lower, supporting ball portion generally designated 30 and a relatively rotatable upper supported ball portion generally designated 33. The mounting and details of such ball portions will presently be described.

The socket portions which coact with such ball portions comprise a two-part metallic bearing shell structure consisting of a lower shell ring 35 and an upper shell portion 36. The lower shell ring 35 is proportioned to be fitted onto the lower ball portion 30 from the bottom and is provided at its upper edge with a flange 37, while the upper shell section 36 is proportioned to fit upon the upper ball section 33 and to be installed thereupon from above and carries at its lower edge a flange 38 which is proportioned to abut the flange 37 when the parts are assembled with the shells bearing against the enclosed ball sections.

Fitted around the socket shells 35, 36 is an elastic cushioning liner 40. The cushioning liner is stretched over the shells and extends downwardly to a position near the lower edge of the shell ring 35. The parts are held together by a cap 42 fitted into the upper end of the sleeve 16 and retained therein by snap ring 26, and when fully assembled, the cushioning liner 40 is also radially compressed. The lower edge of the cushioning liner is radially compressed by an additional mass of rubber which constitutes the lip portion 44 defining the upper rim of a sealing boot or sleeve 45 having a downwardly extending thinner flexible bellowslike portion (undesignated) which projects freely downwardly through the air from the joint and is provided at its lower end with a thickened elastic lip portion 46 which is stretched over a neck portion 48 integral with and which serves to support the lower ball section 30. The upper lip portion 44 of the boot 45 is retained by the bottom flange 24 of the joint housing sleeve 16 and is radially compressed between sleeve 16 and shell ring 35, to thereby complete the sealing of the lower end of the joint assembly. Aligned holes generally designated 50 are formed in the top portions of bearing shell section 36, cushioning liner 40, and cap 42, the latter being equipped with a lubricant fitting 52 through which lubricant can be injected into the joint.

The lower ball section 30 is provided with an annular ball race 55 which opens upwardly and in which bearing balls 56 are fitted, the raceway and balls being so located and proportioned that the centers of the balls lie substantially upon a transverse diametric plane projected through the center of the ball assembly and perpendicular to the steering axis. A central concentric upwardly projecting cylindrical portion 58 integral with the lower ball section 30 is provided having an external wall forming a smooth upward continuation of the inner wall of raceway 55 and projecting into a slightly larger downwardly opening cylindrical pocket 60 in the upper ball section 33. Socket portion 60 and the cylindrical portion 58 fitted thereinto are provided with transversely aligned grooves (undesignated) for the reception of a snap ring 62 which holds the ball sections together and prevents their accidental separation during shipment and handling prior to assembly. The upper ball section, in the area thereof surrounding the socket 60 is provided with a downwardly opening raceway 64 for the balls 56 which thereby journal the upper ball section 33 for free rotation on the lower ball section 30.

The lower portion of the stem 48 of the lower ball section 30 is tapered and fitted in a conformably tapered hole 65 formed in one end of a steering arm 66, shown as a forging, which is adapted to extend rearwardly of the vehicle and to be coupled to suitable steering mechanism (not shown). Near its forward end the arm 66 is vertically thickened to define a cylindrical hublike portion 68 which is reduced in diameter and extends upwardly through an appropriately dimensioned recess 72 in a steering knuckle supporting structure which will presently be described in detail. The stem portion 48 of the ball assembly is radial with respect to the ball and is installed in an inclined position concentric with the steering axis. The housing sleeve 16 for the socket portions is also tilted conformably to and concentric with the steering axis when the suspension parts occupy a normal mean position; that is, with a normal or desired loading of the vehicle.

The steering knuckle supporting assembly comprises two nestedly interfitted sheet metal panlike elements generally designated 75 and 76, the outer margins of which may be contiguous and secured together by welding as indicated at 77. Adjacent such welded margin the two pan sections are provided with complemental stepped portions, 79, 81, extending peripherally thereof and so contoured that the pan sections diverge from one another in a direction away from the margin, and then converge and meet upon a line spaced from the margin, where they may again be seam welded or otherwise secured, as indicated at 83. A box-sectioned rim of great stiffness is thereby provided.

The lower extremity of the steering knuckle support assembly is provided with a substantially flat inwardly directed flange portion 78, in which area the box-sectioned rim is omitted. Flange 78 lies in a plane substantially perpendicular to the steering axis, the recess 72 for hub portion 68 being formed in such flange portion and in a reinforcing plate 74 welded to the top of the flange. The steering arm 66 extends beneath the flange 78 and projects both forwardly and rearwardly from the ball supporting hub portion 68. Reinforcing plate 74 and steering arm 66 are also secured together by means of screws 80 projected upwardly through the steering arm into threaded engagement with suitably tapped holes in the plate 74. The steering arm is thus rigidly connected to the knuckle support assembly 75, 76 and to the ball assembly 30—33 while the steering arm and the plate 74 also stiffen flange 78. A threaded lower extension 84 of the shank 48 of the ball projects beneath the steering arm and is fitted with a nut 84' which secures the ball assembly in place.

A central, hub-encircling portion of the knuckle support assembly is defined by oppositely divergent inwardly and outwardly projecting portions 85, 86, the former integral with pan section 75 and the latter integral with pan section 76, these parts having central apertures respectively designated 88, 90 therein, concentric with the axis of the knuckle spindle 92 and spaced axially a substantial distance therealong and individually welded to a tubular wheel bearing support 94. Support 94 carries suitable wheel spindle bearings 95, 96, the details of mounting and arrangement of which are subject to variation but may correspond to the first embodiment as well as to the disclosure of my copending applications, Serial Nos. 89,125 filed April 22, 1949, now Patent No. 2,631,865 and 266,501 filed January 15, 1952, now Patent No. 2,752,178.

As shown in FIG. 5, the support assembly 75, 76 is narrower, in a direction fore and aft of the wheel, than the internal diameter of the brake drum 100. The web portion of sheet metal pan member 76 also forms a part of the brake backing plate assembly and may serve to support certain of the braking and brake actuating components, which are generally indicated at 102, 104 in FIG. 2. The remainder of the brake backing plate and closure assembly may be defined by a sheet metal backing plate portion 105 welded to and projecting radially from member 76. The upper portion of the knuckle support assembly is drawn to greater depth than the lower portion thereof, so that when assembled with the web-backing plate portions parallel to the plane of the wheel, as shown, the upper flange 106 extends inwardly of the vehicle farther than the lower flange 78 which carries the lower ball assembly previously described. The upper flange 106 carries a forged clamp 108 formed with a substantially cylindrical opening therein which is concentric with the steering axis and which is adapted to rigidly but releasably hold the shank portion 110 of an upper bearing ball 112. The ball 112 may be eccentric with respect to the shank 110 and the shank and ball may be rotatable in the clamp 108 when the clamping screw 114 is loosened, to permit adjustment of the caster and camber angles, the manner in which such adjustment is effected being well known in the art. The ball portion 112 may be solid, as shown, and provided with upper and lower bearing shell portions 115, 116 fitted thereover and generally analogous to the bearing shell sections 36, 35 respectively. An elastic cushioning liner 118 is stretched over the ball and its bearing and is radially compressed in the socket housing defined by the socket housing sleeve 120 and socket housing cap 122 held in the upper end of the housing sleeve 120 by the snap ring 126, these parts being generally similar to, although they may be somewhat smaller than, the corresponding parts of the lower joint previously described.

The socket housing sleeve 120 may also be similarly secured in an opening in the upper suspension arm 14 by welding, as indicated at 128. A lip 130 formed upon the upper end of the lubricant retaining boot 132 coacts with the mass of the elastic liner 118 to cushion the joint and to complete the seal of the lower end thereof in similar fashion.

The details of construction of the wheel may also be varied. In the preferred construction shown, a forged hub flange 140 is provided, integral with the spindle 92, the wheel disk 142 being secured to the flange 140 by bolts 144 and the supporting web 145 of the brake drum 100 also being carried by the bolts 144. Web 145 is formed of sheet metal and drum 100 is cast upon the periphery of the web, while the wheel rim 146 is directly secured as by welding to the disk 142. Drum disk 145 may be permanently secured to the bolts 144 and the bearing lands 147, 149 of the spindle, and the inner surface of the drum 100 may be dressed in one setting of a machine, after assembly of the drum and spindle, to insure concentricity.

In the modified construction shown in FIG. 9, the ball portions are shown as carried by forged steering arm and wheel supporting portions 66a, 78a, respectively, the construction of which may correspond to the disclosure of my copending application Serial No. 429,466, filed May 13, 1954 and now Letters Patent No. 2,998,262. The ball portions may, as shown, be constructed similarly to the last described embodiment. The upper half of the socket housing is defined by a downwardly opening embossment 16a integral with the spring tray portion 70 of the control arm assembly 12a, the inner portion of which tray may engage the coil spring 13a. The lower half of the socket housing is formed by a separate and separable annular cap section 18a somewhat smaller than the maximum diameter of the embossed top section 16a and carrying the bottom retaining flange 24a. Sections 16a, 18a are provided with outturned mating flanges 150, 152 which may be secured together by nuts and bolts (not shown). The elastic liner 40a is radially compressed during installation, and such compression is easily effected without special tools as the bolts are tightened to draw the cap portion 18a upwardly against portion 16a.

In the further modification shown in FIGS. 10 and 11, wherein parts corresponding to those already described are designated by like reference numerals distinguished by the suffix "b," the socket housing body is formed by an integral tubular embossment 16b formed at the outer end of the control arm 12b and open at its upper and lower ends, the housing portion 16b being substantially concentric with the steering axis when the parts are in a mean position. The lower portion 18b of the tubular housing 16b is reduced in diameter to define a shoulder 20b located beneath the shell flanges as 38b, and the parts are compressed and retained by a top cap 42b corresponding to the cap 42 of the first embodiment and similarly retained by a snap ring 26b.

FIG. 12 shows a construction analogous to that of FIG. 10 for an upper control arm 14b, and a solid ball 112b is utilized in this joint, in view of the absence of substantial vertical loading. In this embodiment also, the socket parts are retained in a tubular housing portion 120b formed integrally with the control arm 14b, the parts being retained and the rubber held in compression by a cap 122b held by a snap ring 126b, these parts also corresponding generally to those of the first embodiment.

FIG. 13 shows a construction analogous to that of FIG. 9. In this modified construction, the ball portions 30c and 33c are shown as carried by a forged arm portion 66c and a sheet metal flange 78c of a wheel support assembly 75, 76. The ball portions may, as shown, be constructed similarly to the embodiment described in FIGS. 2-8. The socket housing is defined by a downwardly opening embossment 16c integral with the control arm 12c. A sleeve 18c is fitted in the lower half of the socket housing 16c, the sleeve being secured as by welding to a relatively flat cap section 24c. The section 16c is provided with an outturned flange 150c and the peripheral portion 152c of the cap section 24c bears against the flange portion 150c, the sections 16c and 24c being secured together by bolts 19c or other suitable means. The elastic liner 40c is radially compressed during installation and such compression is easily effected without special tools as the bolts 19c are tightened to draw the cap portion 24c upwardly.

The joint construction shown in FIG. 14 will be recognized as analogous to that shown in FIG. 12 although in this embodiment the adaptability of the joint to forged housing and connecting parts is illustrated. The socket components are mounted in a generally tubular forged housing portion 120c integral with an arm 155 which projects radially therefrom and which is provided with suitable apertures 156, 158 by means of which the assembly may be secured with the aid of bolts or the like to the control arm. The ball 112c is similarly supported and retained in the socket components, and detailed redescription of the other parts will not be required.

In FIG. 15, a joint construction is shown analogous to that shown in FIG. 10, the embodiment in FIG. 15 illustrating the adaptability of the joint to forged housing parts. The socket components are mounted in a forged housing portion 16d integral with an arm 160 which projects radially outwardly therefrom and which is provided with suitable apertures by means of which the assembly may be secured with the aid of bolts 164 or the like to the control arm 12d. The other components of the assembly, including the ball portions 30d and 33d, are constructed and assembled in the manner previously described and a detailed redescription of such components will not be given.

In the embodiment of FIG. 16, the upper end of the tubular knuckle supporting assembly 75e is flanged outwardly to provide a partly spherical annular section 165 and a flat rim flange 166. Portion 165 forms the lower extremity of the socket housing, the upper portion of the socket housing being formed by a generally tubular ring 120e flanged at its lower end as indicated at 168e and secured to flange portion 166 as by bolt means 170. A partly spherical metallic bottom closure or cap 122e is fitted in the spherical portion 165 of the knuckle support and is provided with a rim flange 172 partially overlying the flange 166. The ball 112e is provided with an upwardly extending shank 110e held in a fitting 174 by which it is adapted to be secured to an upper control arm, as will be understood. The bearing shell portions are similar to, but inverted with respect to, such portions of the embodiment of FIG. 2, and a rubber cushioning liner as 118e is interposed between such shells and the supporting means therefor.

FIG. 17 shows a further modified type of oscillatable joint incorporating two radially spaced metallic bearing portions. The socket bearing housing is comprised of a generally annular forged and machined member 200 having a partly spherical opening 202 therein shown converging toward the top, as the parts are positioned in the drawing, but open at the top to expose the upper end of the ball portion 205 and the rigidly connected shank portion 206. The socket opening 202 faces downwardly, the downwardly projecting portions thereof being defined by a substantially cylindrical wall 208, an enlarged counterbored cylindrical wall portion 210 near the bottom, and an internal groove 212 which is adapted to receive the periphery of the bottom closure cap 214, that is retained in the lower end of the opening by an overhanging shoulder as 215 which may be rolled inwardly to secure the cap in place.

The ball portion 205 is substantially smaller than the socket opening, and a metallic or plastic bearing shell 216 and elastic cushioning liner 218 are interposed. At its lower end the bearing shell 216 is provided with an outturned flange 220 which projects into the enlarged counterbored portion 210 of the socket opening and into a conformably proportioned internal groove 222 formed in and near the lower end of the cushioning liner 218. The cushioning liner is also provided with a radially projecting internal bottom flange 224 which underhangs the flange 220. An integral upward continuation of the elastic cushioning liner projects freely from the joint and defines a lubricant retaining sleeve 225, the upper end thereof being provided with a thickened bead portion 226 of reduced diameter which is adapted to be stretched over the shank 206 and form a tight seal thereagainst. The portion of the liner 218 which extends downwardly into the joint is longitudinally stretched and radially compressed and is retained in position by the pressure thereagainst and by the interengagement of flange and groove portions 220, 224, 222. These flanges are also urged together by the cap 214 which is pressed upwardly and forces the shell 216 upwardly, thereby compressing the cushioning liner 218, such pressure being imposed during installation of the cap, and being maintained by the rolled flange 215.

The ball portion 205 is cut off on a flat transverse plane slightly below the center, as indicated at 230 and a central re-entrant enlarged opening 232 is formed in the ball extending upwardly from the surface 230, such opening having a spherical upper surface portion defining an inner socket 233 concentric with the center of the ball. A spherical bearing portion 234 integral with the cap 214 rockably engages the inner socket surface 233 of the ball and is carried by an integral tubular embossment 235 pressed upwardly from the center of the cap. The height of the portion 235 is such that when the cap is installed in the manner perviously described, the portion 234, bearing upwardly against the inner socket portion 233, also urges the ball 205 upwardly and exerts compressive effort upon the main ball and socket portions 205, 216 and upon the liner 218.

Lubricant passages 236 are formed in the wall of tubular embossment 235, providing communication between the interior of such embossment and the opening 232 in the bottom of the ball, and with the space within the joint beneath the ball. A conventional lubricant fitting 238 may be installed in the tubular embossment 235, through which lubricant may be injected into the joint to lubricate the surface portions 233, 234 as well as the engaging surfaces of portions 205, 216. It will be seen that the joint also provides a relatively large lubricant storage area 231 beneath the ball.

The modification shown in FIGS. 18 and 19 is particularly adapted for the oscillatable support of a shaft which extends through and beyond the joint. The shaft so supported in the illustrative embodiment depicted in these views is designated 240. In the area of the joint, the shaft is provided with an enlarged cylindrical portion 242 and with a snap ring groove 244, which is centered on the joint. The surface of the cylindrical portion 242 is also provided with a longitudinal keyway 245. Two metallic rings designated 246, 248 are fitted on the cylindrical shaft portion 242, one such ring being located on each side of groove 244 and the outer surfaces of the rings 246, 248 having spherical surfaces which are concentric with the center 255 of the joint. Center 255 is located on the axis of the shaft and midway of the length of enlarged shaft portion 242. The plane of separation between the rings also preferably conforms to a plane perpendicular to the axis of the shaft projected through the rocking center of oscillation 255. Complemental and correspondingly positioned longitudinal keyway portions 250, 252 are formed in the internal surfaces of the rings 246, 248 respectively, and in the assembly of the joint are in radial alignment with keyway 245, a key 254 being fitted into the complemental keyway portions 245, 250, 252 and bridging the rings 246, 248 and shaft portion 242 to lock them against rotation. A bearing shell ring 256 is fitted upon and engages the spherical outer surface of ring 246, and a similar bearing shell ring 258 is fitted in like fashion upon ring 248. The bearing shells are retained in a socket housing structure formed of two complemental oppositely outwardly and axially embossed partly spherical portions 260, 262 which may be formed with integral flat sheet metal supporting portions 264, 266 respectively. The spherical contouring of the portions 260, 262 is also concentric with the center of oscillation, and the internal diameter of such portions exceeds the external diameter of the shell rings 256, 258, to accommodate an elastic cushioning liner assembly therebetween. The housing portions may be held together by nut and bolt means as 268 extending through the flat flange portions 264, 266, as shown. A spacing and supporting web as 270 may also project between the flange portions 264, 266, the parts being attached to such web by the same bolt and nut means 268.

The cushioning liner assembly is also formed in two sections which meet upon the transverse plane of the center of oscillation. Each cushioning liner is held in a fashion similar to the mounting of the liner 218 of the embodiment last described, the liner 272 being longitudinally stretched and radially compressed between the shell and housing portions 256, 260 respectively, while the liner 274 is similarly held between the ring and housing portions 258, 262 respectively. The inner abutting ends of the liners are provided with thickened and internally grooved rim portions 275, 276 accommodated in relieved areas as 278, 280 formed in housing portions 260, 262, and the bearing shells 256, 258 are provided with peripheral flanges 282, 284 projecting into the internal grooves (undesignated) in the cushioning liners. The free extremities of the liners also project longitudinally from the ends of the joint assembly and are provided with sealing bead portions as 285, 286 engaging the surface of the shaft.

In drawing the housing portions 260, 262 together, during the assembly of the joint, the tightening of the bolt and nut means 268, pulls the joint parts together, including the thickened rim portions 275, 276 of the cushioning liners, the liners being thereby also radially compressed and the ball rings 246, 248 and socket rings 256, 258 also being urged together with desired pressure.

A further modification of my invention is shown in FIGS. 20–23, this modification being adapted for use in a suspension of the wishbone type having a direct acting spring mounted above the upper wishbone and in line with the steering axis. With this arrangement, none of the vehicle load is applied to either control arm so that the control arms function only as guides and wheel supports, and it therefore becomes feasible to mount the lower ball 450 in inverted position without creating undue unit pressure between the ball and socket. The lower ball joint construction requires no thrust bearing, due to the low bearing pressures and the construction of this joint may be generally similar to that of the upper joint shown in FIG. 2, although inverted in position. The lower control arm 452 is formed of pressed sheet metal and provided at its outer end with an upturned flange 454 in which a sheet metal bearing retainer cup 455 is fitted, the cup being welded to the arm as indicated at 456. The rubber liner 458 is fitted in the cup and extends upwardly thereabove encircling and cushioning the bearing liner shells 460, 462. The shells and cushioning liner are retained by a retainer ring 464 which also retains the lower edge of the sealing boot 465. The upper edge of the boot is in sealing engagement with the stem portion 466 of the ball and the stem is retained by a nut 468 in the lower inturned arm portion 470 of a forged knuckle spindle support generally designated 472. The spindle 474 projects outwardly from the support 472 and is formed as a separate machined and ground forging secured to the support as by cap screws 475. The wheel structure, generally designated 476, and the brake assembly, generally designated 477, are indicated as of conventional construction, and detailed description thereof will not be required.

At its upper end, the knuckle support 472 is provided with an integral cylindrical kingpin portion 478 (see FIG. 21). A bearing ball 482 connects kingpin portion 478 to the upper wishbone arm 484, and is provided with an internal opening fitted upon the kingpin portion 478. The bearing ball has an integral tubular stem portion 485 which extends downwardly therefrom and which bears against an antifriction thrust bearing assembly 486 seated against a shoulder 488 formed on the support 472. A bearing bushing 490 is pressed in the ball neck 485 to journal the lower end of the kingpin portion 478, and a similar bearing bushing 491 in fitting portion 494 journals the upper end of the kingpin portion 478. The cylindrical opening in the ball is enlarged at its upper end to receive the lower extremity of the tubular spring supporting fitting 494. The cylindrical lower extremity of such fitting which projects into the enlarged portion 492 of the opening in the ball is designated 495, and the upper end thereof which carries bushing 491 is designated 498. The kingpin portion 478 is rotatable in the bearing bushings 490, 491, during steering movements of the wheels. Spacedly above the ball joint assembly and below the upper portion 498, the fitting 494 is provided with a radial flange 496, and portion 498 above the flange is externally threaded. A funnel-shaped spring seat member, generally designated 500, is coupled to the support 494, being provided with a tubular lower portion 502 which is internally threaded at its lower extremity, as indicated at 504, and threadedly interengaged with portion 498.

The conically upwardly diverging upper portion 505 of the spring seat member is provided with a top flange 506 supporting and reacting against the lower end of the coil spring 508 (see FIG. 20). The spring is located by an inverted locating cup 510 fitted over flange 506 and downwardly peripherally flanged, as indicated at 512, to embrace the margin of the flange 506. An angular sheet metal retaining ring 514 is interposed between the lower convolution of the spring and the locating cup 510. The spring supporting bushing 494 is retained upon the cylindrical bearing portion 478 as by means of a nut 515 and washer 516, the upper extremity of kingpin portion 478 being reduced and threaded to provide a shoulder for the washer and a threaded portion for the nut 515, as shown. The nut and washer 515, 516 are not tightened down against the upper end of bushing 494, so that the kingpin and support turn independently of the spring supporting and ball joint portions during steering.

Referring to FIG. 21, lubricant fitting 518 is mounted in the side of the flange 496 of the spring supporting sleeve 494 and communicates through a radial passage 520 with the space 522 within fitting 494 between the bearing bushings 490, 491. Lubricant may thus be forced to the bearing surfaces and may also flow outwardly through aligned radial holes in the fitting portion 495 and ball section 482 to lubricate the interengaging surfaces of the ball and the spherical bearing shells 525, 526. The shell portions 525, 526 may be alike and positioned symmetrically oppositely with respect to one another and provided with abutting outturned radial flanges as 528, 529 which, when the parts are assembled as shown in FIG. 21 are located substantially upon a central transverse diametric plane of the ball. The flanges project into an internal groove 530 in the symmetrical cushioning liner 532 and assist in locating such liner, while the liner in turn is stretched thereover and assists in holding the shells against separation. The liner is also compressed between the bearing shells and an annular housing portion 533 which, in the preferred construction shown, is integrally pressed from the metal of the outer end of the arm. An inturned bottom flange 534 prevents downward escape of the bearing parts and retains the upper flange of the sealing boot 535 while compressing such boot flange and the lower extremity of the liner 532 against the shell 525. The upper extremity of the housing portion 533 is flared outwardly, as indicated at 536. A central portion of the annular housing portion 533 is also enlarged, in a stepped area designated 538, to accommodate flange portions 528, 529 and the part of the liner which encircles such flanges. A ring 540 is also fitted in the enlarged upper end of the housing portion 533 to lock the liner and the bearing portions in the housing, the ring being held by an annular plate 542 fitted over the top of the bearing housing portion and held by suitable means, such as the screws 544.

It will be seen that with this arrangement, the load of the vehicle is transmitted downwardly from a high portion of the vehicle structure, designated 545, which rests upon the upper end of the spring 508 through the spring supporting bushing 494, ball and stem portions 482, 485, thrust bearing 486 and through the knuckle support 472 to the wheel spindle and wheel. A shock absorber 546 which may also be of a conventional variety may be arranged to react against the lower wishbone arm 452, as at 547.

In FIG. 24 a further modification is illustrated in connection with a suspension of the trailing link type. The lower suspension arm is designated 550 and the upper susupension arm 552. The ouer end of the lower arm is internally threaded as indicated at 554 and an externally threaded eccentric bushing 555 is screwed into the same. A rubber bushing 556 is fitted in the threaded bushing 555 and may be preliminarily assembled therein together with a smooth bushing 558. It will be appreciated that this assembly may be of the "Silentbloc" type if desired, or that other suitable means may be employed to prestress the rubber. The inner bushing 558 is mounted on a stud 560 which is shouldered, reduced and threaded at its outer end to receive the washer 562 and retaining nut 564. Stud 560 is integral with kingpin supporting portion 565, which may correspond to the kingpin supporting portion 308 of the embodiment of FIG. 1. Supporting portion 565 is also pivotally connected, in similar fashion, to a kingpin bolt 566 corresponding to the bolt 336 of the embodiment of FIG. 1 and arranged to connect the same to the generally conical support 570 which extends in a direction outwardly of the vehicle and radially inwardly into engagement with the periphery of the spindle tube 572 to which it may be secured by welding. Adjacent the tube 572 the support 570 is provided with an annular flat land 574 to which the brake backing plate 575 is secured as by bolts 576. The upper and lower peripheral portions of the support 570 are provided with substantially horizontal inturned flanges 577, 578 through which the kingpin bolts 580, 566 extend. The upper kingpin bolt 580 may correspond in construction to the lower bolt 566 previously mentioned, and both such bolts are concentric with the steering axis and at their inner ends are threadedly engaged in suitably tapped holes as 582 in the spindle tube 572. Each of the bolts is provided with a shoulder as 584 adjacent its threaded inner extremity adapted to seat tightly against the spindle tube. A reinforcing plate, as 585, 586 is also secured as by welding to each of the flange portions 577, 578, in the area through which the bolts 580, 566 project. When the bolts are tightened into the spindle tube, the head portions 588, 590 are also tightened against the respective reinforcing plates 585, 586 carried by the flange portions 577, 578, but are not driven inwardly with sufficient pressure to wedge them against the ends of the bushings 565, 592. A bearing washer 594 is interposed between the upper end of kingpin bushing 592 and flange 577, and an antifriction bearing 595 is interposed between the lower kingpin bushing 565 and flange 578.

The stem of each of the bolts 566, 580 is journaled in smooth bearings as 596, 597, and lubricant may be introduced to the bearing surfaces as through the conventional lubricant fitting 598 and appropriate internal passages 600.

The spindle 602 is journaled in the tube 572 in a manner generally similar to the arrangement of the first embodiment, the brake drum assembly 604 being attached to the spindle hub portion 605 by the bolts 606 which also serve to attach the wheel structure, fragmentarily illustrated at 608.

Other portions of the embodiment of FIG. 24, being of conventional character and/or analogous to parts already described, will not require further explanation.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

What is claimed is:

1. In a ball and socket structure, a socket-defiining portion having an internal surface at least a part of which is curved generally spherically, said internal surface having an enlarged area defining an annular inwardly opening recess, a ball portion substantially smaller than and fitted into said socket-defining portion, a metallic bearing shell fitted on and frictionally engaging said ball portion within said socket defining portion, and an elastic cushioning liner interposed between and compressed between said shell and said socket-defining portion, a part of said cushioning liner extending into said annular recess, and an outwardly projecting flange on said shell, said flange having surface portions extending outwardly substantially radially and which are substantially radially aligned with said annular recess, and said liner portion embracing said flange within said recess.

2. A ball and socket structure as defined in claim 1, including a second shell engaging another part of the ball portion adjacent the part engaged by the first-mentioned shell, said shells having abutting edges, said flange being carried by the abutting edge of the first-mentioned shell, said second-mentioned shell having a similar flange abutting the flange of the first-mentioned shell, said liner embracing both of said flanges and tending to hold them together and to urge the shells against the ball.

3. A ball and socket structure as defined in claim 1, including a second shell engaging another part of the ball portion adjacent the part engaged by the first-mentioned shell, said shells having abutting edges, said flange being carried by the abutting edge of the first-mentioned shell, said second-mentioned shell having a similar flange abutting the flange of the first-mentioned shell, said liner embracing both of said flanges and tending to hold them together and to urge the shells against the ball, and retaining means including portions bearing against opposite sides of the part of said liner which embraces said flanges.

4. A ball and socket structure as defined in claim 1, including a second shell engaging another part of the ball portion, said shells having parallel edges, said flange being carried by such edge of the first-mentioned shell, and a radially outwardly projecting flange carried by such edge of the second-mentioned shell, said liner including portions lying between each shell and the socket-defining structure and also including portions embracing both of said flanges.

5. In a ball and socket joint, a rigid structure defining a socket, a ball portion substantially smaller than and fitted into said socket, means for supporting the ball portion in position to sustain a load imposed in a direction corresponding to an axis extending substantially radially through the ball portion, a metallic bearing shell fitted on and frictionally engaging said ball portion within said socket-defining portion, a substantially flat flange on said shell within the socket, said flange extending outwardly from said shell and being substantially concentric with said axis, and a relatively thin elastic cushioning liner interposed and compressed between said shell and said socket-defining structure, a portion of said liner being disposed between said flange and said socket in said direction, whereby said portion will be compressed between the flange and the socket-defining structure by such a load applied to the joint in said direction.

References Cited in the file of this patent

UNITED STATES PATENTS

| | | |
|---|---|---|
| 1,940,895 | Wacker | Dec. 26, 1933 |
| 2,112,325 | Bentzinger et al. | Mar. 29, 1938 |
| 2,417,160 | Graham | Mar. 11, 1947 |
| 2,455,343 | Slack et al. | Nov. 30, 1948 |
| 2,580,119 | Meyers | Dec. 25, 1951 |
| 2,592,566 | Heim | Apr. 15, 1952 |
| 2,631,044 | Booth | Mar. 10, 1953 |
| 2,754,141 | Latzen | July 10, 1956 |
| 2,759,244 | Heim | Aug. 21, 1956 |

FOREIGN PATENTS

| | | |
|---|---|---|
| 1,012,644 | France | Apr. 16, 1952 |